US010363700B2

(12) United States Patent
Yun et al.

(10) Patent No.: US 10,363,700 B2
(45) Date of Patent: Jul. 30, 2019

(54) BIORIENTED POLYETHYLENE FILM

(75) Inventors: Xiao B. Yun, Beijing (CN); Rongjuan Cong, Lake Jackson, TX (US); Jephrey Pan, Beijing (CN); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1130 days.

(21) Appl. No.: 14/240,776

(22) PCT Filed: Aug. 26, 2011

(86) PCT No.: PCT/CN2011/079020
§ 371 (c)(1),
(2), (4) Date: Feb. 25, 2014

(87) PCT Pub. No.: WO2013/029223
PCT Pub. Date: Mar. 7, 2013

(65) Prior Publication Data
US 2014/0205823 A1    Jul. 24, 2014

(51) Int. Cl.
| B29C 55/14 | (2006.01) |
| B29C 55/00 | (2006.01) |
| B29C 48/00 | (2019.01) |
| C08J 5/18 | (2006.01) |
| C08L 23/08 | (2006.01) |
| B32B 15/08 | (2006.01) |
| B32B 15/20 | (2006.01) |
| B32B 27/08 | (2006.01) |
| B32B 27/10 | (2006.01) |
| B32B 27/16 | (2006.01) |
| B32B 27/32 | (2006.01) |
| B32B 27/34 | (2006.01) |
| B32B 27/36 | (2006.01) |
| B32B 7/02 | (2019.01) |
| B29C 47/00 | (2006.01) |
| C08L 23/10 | (2006.01) |
| B29K 23/00 | (2006.01) |

(52) U.S. Cl.
CPC ........ *B29C 55/005* (2013.01); *B29C 48/0018* (2019.02); *B29C 55/143* (2013.01); *B32B 7/02* (2013.01); *B32B 15/08* (2013.01); *B32B 15/20* (2013.01); *B32B 27/08* (2013.01); *B32B 27/10* (2013.01); *B32B 27/16* (2013.01); *B32B 27/32* (2013.01); *B32B 27/34* (2013.01); *B32B 27/36* (2013.01); *C08J 5/18* (2013.01); *C08L 23/0815* (2013.01); *B29K 2023/0625* (2013.01); *B32B 2307/518* (2013.01); *B32B 2307/54* (2013.01); *B32B 2307/736* (2013.01); *B32B 2439/00* (2013.01); *B32B 2553/00* (2013.01); *C08J 2323/08* (2013.01); *C08L 23/10* (2013.01); *Y10T 428/24992* (2015.01); *Y10T 428/31913* (2015.04)

(58) Field of Classification Search
CPC .................. B29C 47/0057; B32B 2307/518
USPC ....................................... 264/210.7
See application file for complete search history.

(56) References Cited

U.S. PATENT DOCUMENTS

| 3,141,912 A | 7/1964 | Goldman |
| 3,456,044 A * | 7/1969 | Heinz ................. B29C 47/0026 264/567 |
| 1,500,873 A | 2/1978 | Lowery, Jr. et al. |
| 4,277,594 A * | 7/1981 | Matthews ............. B29C 61/003 264/289.6 |
| 4,354,997 A | 10/1982 | Mizutani et al. |
| 4,463,153 A | 7/1984 | Mizutani et al. |
| 4,597,920 A | 7/1986 | Golike |
| 4,680,207 A | 7/1987 | Murray |
| 4,801,652 A | 1/1989 | Mizutani et al. |
| 4,808,359 A | 2/1989 | van der Molen |
| 5,589,561 A | 12/1996 | Barry et al. |
| 6,306,969 B1 * | 10/2001 | Patel ........................ C08J 5/18 428/35.7 |
| 6,436,547 B1 | 8/2002 | Toft et al. |

(Continued)

FOREIGN PATENT DOCUMENTS

| GB | 866820 A | 5/1961 |
| JP | 6127393 A | 5/1994 |

OTHER PUBLICATIONS

Supplementary European Search Report for EP11871555, dated Feb. 9, 2015, pp. 1-3.

(Continued)

*Primary Examiner* — Atul P. Khare

(57) ABSTRACT

The present invention discloses a process for forming a biaxially oriented film. The process includes first selecting a polyolefin resin wherein said polyolefin resin comprises a linear low density polyethylene resin characterized by having from 9 to 35 weight percent of the total weight of linear low density polyethylene resin eluting from a CEF at a temperature greater than 97.0° C.; and further characterized by having a CDR of from 33 to 80 and a Mw Ratio of from 0.15 to 0.45. Next a film is formed from the polyolefin resin selected in the first step. Finally the film formed in the second step is oriented in a sequential manner. The films produced by this process are characterized by having an ultimate elongation at least 1.5 times greater in the MD as compared to the CD and the 2% secant modulus is a least 1.25 times greater in the CD as compared to the MD. The films are further characterized by having free residual shrinkage of less than 10% in the MD and less than 10% in the CD when exposed to a temperature of 90° C. for 10 minutes.

13 Claims, 1 Drawing Sheet

(56) References Cited

U.S. PATENT DOCUMENTS

| | | | |
|---|---|---|---|
| 6,448,341 B1* | 9/2002 | Kolthammer | C08F 210/16 264/310 |
| 6,462,161 B1* | 10/2002 | Cady | C08F 210/00 526/160 |
| 6,479,137 B1 | 11/2002 | Joyner et al. | |
| 7,048,822 B2 | 5/2006 | Yamashita et al. | |
| 8,080,294 B2 | 12/2011 | Lu | |
| 8,921,500 B2* | 12/2014 | Karjala | C08F 10/00 525/324 |
| 2003/0139546 A1* | 7/2003 | Jain | C08L 23/0815 526/160 |
| 2008/0237935 A1 | 10/2008 | Jung et al. | |
| 2009/0156764 A1 | 6/2009 | Malakoff et al. | |
| 2009/0297810 A1* | 12/2009 | Fiscus | B32B 27/32 428/220 |
| 2010/0119745 A1* | 5/2010 | Nieto | B32B 7/02 428/35.7 |
| 2011/0003940 A1 | 1/2011 | Karjala et al. | |
| 2011/0015346 A1 | 1/2011 | Hermel-Davidock et al. | |
| 2011/0177313 A1* | 7/2011 | Chai | B29C 47/0026 428/220 |
| 2012/0164421 A1* | 6/2012 | Shen | B29C 47/0023 428/218 |
| 2013/0035444 A1* | 2/2013 | Karjala | C08F 8/30 525/180 |
| 2013/0144019 A1* | 6/2013 | Demirors | C08F 10/00 526/165 |

OTHER PUBLICATIONS

PCT/CN2011/079020, International Preliminary Report on Patentability dated Mar. 4, 2014.
PCT/CN2011/079020, Written Opinion of the International Searching Authority dated Feb. 26, 2014.
PCT/CN2011/079020, International Search Report dated Mar. 7, 2013.
MONRABAL_et_al_Crystallization_Elution_Fraction Macromol_Symp_257_71-79_(2007).
PCT/CN2011/079020.
Dow Global Technologies, Inc., EP Appln. No. 2016127, Decision of the Opposition dated Sep. 22, 2016.
Albrecht, A., et al., Applied Polymer Science, 2015, pp. 1-8.
Dow Global Technologies, Inc., EP Patent No. 2750863, Notice of Opposition dated Jun. 29, 2016.
Dow Global Technologies, Inc., EP Patent No. 2750863, Response dated Sep. 19, 2017.
Dow Global Technologies, Inc., EP Patent No. 2750863, Opponent Further Submissions dated Jul. 19, 2018.
Dow Global Technologies, Inc., EP Patent No. 2750863, Further Submissions dated Jul. 19, 2018.
Dow Global Technologies, Inc., EP Patent No. 2750863, Decision of the Opposition dated Oct. 18, 2018.

* cited by examiner

BIORIENTED POLYETHYLENE FILM

FIELD OF THE INVENTION

The present invention relates to a bioriented polyethylene film, to a process for producing the bioriented polyethylene film and to the use of the polyethylene bioriented film for flexible packaging.

BACKGROUND AND SUMMARY OF THE INVENTION

Polyethylene films are widely used in flexible packaging, such as heavy duty shipping sacks, stand-up pouches, detergent pouches, satchets, etc. A number of properties must be provided in order to meet the package requirements in terms of integrity and attractiveness. These properties include: 1) excellent optical properties, such as high gloss, high clarity and low haze, 2) sufficient abuse resistance, such as high tensile strength, high puncture and impact resistance, 3) good sealing properties, such as low seal initiation temperature, broad sealing window, high seal strength and high hot tack.

Conventional blown or cast polyethylene films were widely used in flexible packaging, either as stand-alone packaging or lamination film. With market trends towards sustainability, flexible packaging continues to be down-gauged. As a result, higher film stiffness combined with toughness is required. For normal blown or cast polyethylene (or "PE") films, the 2% secant tensile modulus is preferably about 150~250 MPa. By involving middle density or high density PE, stiffness can be enhanced, but that will compromise toughness and film clarity.

Bi-orientation is one of the popular fabrication processes to boost film stiffness and toughness. Clarity, stiffness, and toughness of the film can be dramatically improved by orientation. However, shrinkage properties are also gained through orientation. For most flexible packaging, residual shrinkage is not a desired property because high residual shrinkage will lead to sealing winkles, dimensional instability or other problems in downstream lamination or printing processes. Most of the incumbent polyethylene orientation technologies, like the double bubble process, are designed to produce a shrink film, not a dimensionally stable base film, such as lamination film for flexible packaging.

U.S. Pat. Nos. 4,354,997 and 4,463,153 disclose a process for producing biaxially oriented blown polyethylene films by biaxially stretching non-stretched tubular films produced from an ethylene polymer, such as low density polyethylene, linear low density polyethylene or a copolymer of ethylene as a main component and an alpha-olefinically unsaturated monomer. The non-stretched tubular film is expanded and extended under particular conditions at a special temperature profile simultaneously in the cross-direction and in the machine direction by means of internal air pressure.

European Patent Application 0 240 705 relates to tubular heat shrinkable, biaxially stretched, blown films of a mixture of (A) 90 to 50 percent by weight of a linear ethylene/alpha-olefin copolymer having a density, of 0.90 to 0.93 g/cm$^3$ at 25° C. and (B) 10 to 50 percent by weight of an ethylene polymer having a density of 0.87 to 0.91 g/cm$^3$ at 25° C. and less than the density of the copolymer (A) by at least 0.014 g/cm$^3$. The non-stretched tubular film is expanded and stretched and, at the same time, biaxially oriented simultaneously in the cross-direction and machine direction by means of air pressure in the tube.

British Patent specification 866,820 relates to films made of high or low pressure polyethylene, polypropylene or ethylene/propylene copolymers. The polymeric material which has been oriented by uni-axial or bi-axial stretching during its production is first subjected to high energy ionizing irradiation. Then the material is heated and uni- or bi-axially oriented and finally cooled. A tubular film is used as a starting material for the first biaxial orientation. Due to the irradiation, the high temperature tensile strength of the film is increased. The biaxial orientation after irradiation is carried out by inflating the film with air or other gas or with a liquid to form a bubble. According to this bubble technique a blown film is produced which is simultaneously oriented in the cross-direction and in the machine direction.

U.S. Pat. No. 4,680,207 relates to a biaxially oriented linear low density polyethylene film which has been stretched in the cross-direction at a stretching ratio of greater than 1 to less than 3 and in the machine direction at a stretching ratio of less than 6 but greater than the stretching ratio in the cross-direction. The film is produced as follows: a molten linear low density polyethylene which is optionally mixed with a low density non-linear polyethylene resin is extruded, blown to a film and biaxially oriented in special equipment. The film is useful for producing tubular and heavy duty shipping sacks.

For producing shrinkable films having high optical clarity, good shrink properties and good mechanical properties, British Patent specification 2,097,324 suggests a film made by stretching a film made of the following homogeneous polymeric composition:

(1) 5 to 100 weight percent of a linear copolymer of ethylene with at least one C$_8$-C$_{18}$-alpha-olefin, said polymer having a density of 0.900 to 0.940 g/cm$^3$ and two distinct crystallite melting regions below 128° C. as determined by differential scanning calorimetry (DSC), the temperature difference between those regions being at least 15° C. and (2) 0 to 95 weight percent of at least one polymer selected from the group consisting of ethylene homopolymers and copolymers of ethylene with an ethylenically unsaturated comonomer, said polymer having only one crystallite melting point below 128° C.

The stretching of the film must be carried out within the temperature range defined by the two crystallite melting points of the copolymer (1). The polymers (2) are conventional ethylene homopolymers or copolymers. According to British Patent Specification 2,097,324 "conventional ethylene homopolymers or copolymers" are high density or low density polyethylene made at high pressure or low pressure. According to British Patent Specification 2,097,324, such conventional ethylene polymers having only one crystallite melting point below 128° C., are not useful for producing the shrink films and linear copolymers of ethylene and 1-octene or another alpha-olefin wherein the alpha-olefin comonomer is present in such small amounts that a second DSC peak is not observed are not suitable for producing the shrink films either. The films are produced on a tubular film production line which combines the extrusion and the orientation of the film. British Patent 2,097,324 teaches by reference to U.S. Pat. No. 3,141,912 that the tubular film is oriented by a combination of expansion and longitudinal stretching. The film is biaxially oriented in a continuous manner in two mutually perpendicular directions.

The ethylene polymers and polymer compositions disclosed in U.S. Pat. Nos. 4,354,997, 4,463,153 and 4,680,207, in European Patent Application 0 240 705 and in British Patent specifications 866,820 and 2,097,324 are useful for producing films which are simultaneously bioriented in the machine direction and cross-direction. However, only blown tubular films can be bioriented according to the teaching in the above-mentioned publications. A special processing line is required for the biorientation process. The processing line must be able to maintain a permanent gas pressure inside the tubular film. The teaching of the above-mentioned publications is not useful for biorienting cast films or other flat, i.e. non-tubular films.

Flat films such as cast films are usually bioriented in at least two steps, first in one direction and then in the other direction. Prior attempts to biorient, on a cast film production line, a flat film produced from the polymers disclosed in British Patent Specification 2,097,324 were not successful, as reported in U.S. Pat. No. 5,589,561.

European Patent Application 0212731 suggests the preparation of a mono-axially oriented cast film on the basis of an ethylene homo- or copolymer having a density below 940 kg/m$^3$. The ethylene polymer may be blended with high density polyethylene or polypropylene and/or different types of ethylene homo or copolymers having a low density. The use of low density ethylene homopolymers, optionally mixed with minor amounts of other ethylene polymers, for preparing the mono-axially oriented film is exemplified.

However, it has been observed that polyethylene (PE) orientation is very difficult in both flat cast tenter frame and blown double bubble processes due to the narrow orientation window of PE. For the double-bubble process, film converters typically either co-extrude PE with polypropylene (PP) or crosslink PE to facilitate the second bubble stability. For the tenter-frame process, PP is widely used and known as biaxially oriented PP (BOPP) film in the packaging industry, while PE is not commercially fabricated by this process due to its narrow orientation window.

It would be desirable to provide a new bioriented film based on ethylene polymers which can be produced from a process involving at least two sequential orientation steps, such as by using the tenter frame process in which the processing conditions, such as temperature and stretching ratio, can be chosen within a relatively broad range and the process parameters may be changed to some extent during the stretching process without a substantial loss in quality of the bioriented film.

Accordingly, in one aspect, the present invention is a process for forming a biaxially oriented film comprising first selecting a polyolefin resin wherein said polyolefin resin comprises a linear low density polyethylene resin characterized by having from 9 to 35 weight percent of the total amount of the linear low density polyethylene resin eluting from a crystallization elution fractionation (CEF) instrument (at a temperature greater than 97.0° C.; and further characterized by having a comonomer distribution ratio (CDR) of from 33 to 80 and a molecular weight ratio (Mw Ratio) of from 0.15 to 0.45. Next, a film is formed from the polyolefin resin selected in the first step. Finally the film is oriented, preferably in a range of from 3 to 5 times in the machine direction and from 3 to 7 times in the cross direction, such that the resulting film is characterized by having: a) an ultimate elongation at least 1.5 times greater in the machine direction (MD) as compared to the cross direction (CD), b) a 2% secant modulus which is at least 1.25 times greater in the CD as compared to the MD, and c) free residual shrinkage of less than 10% in the MD and less than 10% in the CD when exposed to a temperature of 90° C. for 10 minutes, more preferably <5% in both the MD and CD.

In another aspect, the present invention is a film comprising a polyolefin resin comprising a linear low density polyethylene resin characterized by having from 9 to 35 weight percent of the total amount of linear low density polyethylene resin elutes at a temperature greater than 97.0° C. in CEF; and further characterized by having a CDR of from 33 to 80 and a Mw Ratio of from 0.15 to 0.45, wherein said film is characterized by having: a) an ultimate elongation at least 1.5 times greater in the MD as compared to the CD, b) a 2% secant modulus which is at least 1.25 times greater in the CD as compared to the MD, and c) free residual shrinkage of less than 10% in the MD and less than 10% in the CD when exposed to a temperature of 90° C. for 10 minutes, more preferably <5% in both the MD and CD.

DETAILED DESCRIPTION OF THE INVENTION

Test Methods

Figure 1:
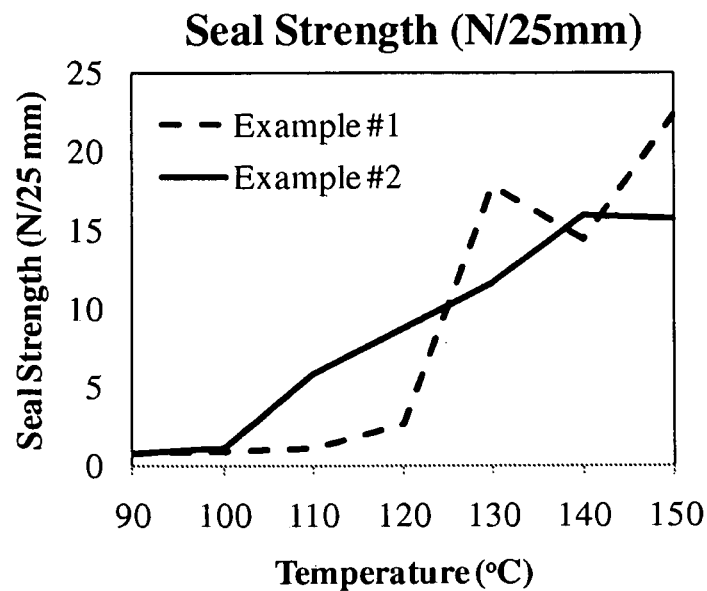
FIG. 1 is a graph showing ultimate seal strength as a function of sealing temperature for Examples 1-2.

Unless otherwise indicated, the following properties are determined by the indicated test method throughout this specification.

Density is determined according to ASTM D-792.

Melt index, or $I_2$ for ethylene polymers (that is, those polymers comprising at least 50% by weight of units derived from ethylene monomer) is determined according to ASTM D1238, 190° C., 2.16 kg.

Tensile strength, ultimate elongation and 2% secant modulus were measured with a ZWICK universal tester by ASTM D 882.

Dart drop impact was tested with a Ceast dart drop impact tester by ASTM D 1709.

Hot tack was conducted on a J & B hot tack tester 400, with a sample of 25 mm width, 0.5 seconds of sealing time, and 0.275 N/mm$^2$ of seal pressure. Sealed specimens were backed up with polyethylene terephthalate (PET) tape. The peel speed was 200 mm/sec. The delay time was 0.1 second.

For the seal strength test, heat seal was conducted on a J & B hot tack tester 400. The sample width, seal parameters, and backing were the same as in the hot tack test. The seal strength was tested on a ZWICK universal tester, with 500 mm/s of peel speed after 24 hours of conditioning.

The free residual shrinkage was determined by:

$$\text{Percent Shrinkage} = (L_1 - L_2)/L_1 \times 100$$

in which $L_1$ is the sample length prior to thermal treatment, and $L_2$ is the sample length after 10 minutes in an oven equilibrated at a specified temperature. Two different oven temperatures were used (70° and 90° C.). The specimen size was 6 cm×6 cm, prior to thermal treatment ($L_1$=6 cm).

Surface tension can be measured according to ASTM D2578-09.

CEF

Crystallization Elution Fractionation (CEF) is described by Monrabal et al, *Macromol. Symp.* 257, 71-79 (2007). The instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is now referred to as "ODCB." ODBC is sparged with dried nitrogen ($N_2$) for one hour before use. Dried nitrogen is obtained by passing nitrogen at <90 psig over $CaCO_3$ and 5 Å molecular sieves. Sample preparation is done with an autosampler at 4 mg/ml under shaking at 160° C. for 2 hours. The injection volume is 300 μl. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The data are collected at one datapoint/second.

The CEF column is packed with glass beads at 125 μm±6% (such as those commercially available from MO-SCI Specialty Products) with ⅛ inch stainless tubing according to US 2011/0015346 A1. The internal liquid volume of the CEF column is between 2.1 and 2.3 mL. Temperature calibration is performed by using a mixture of NIST Standard Reference Material Linear polyethylene 1475a (1.0 mg/ml) and Eicosane (2 mg/ml) in ODCB. The calibration consists of four steps: [(1)]Calculating the delay volume defined as the temperature offset between the measured peak elution temperature of Eicosane minus 30.00° C.; [(2)]Subtracting the temperature offset of the elution temperature from the CEF raw temperature data. It is noted that this temperature offset is a function of experimental conditions, such as elution temperature, elution flow rate, etc.; [(3)]Creating a linear calibration line transforming the elution temperature across a range of 30.00° C. and 140.00° C. such that NIST linear polyethylene 1475a has a peak temperature at 101.00° C., and Eicosane has a peak temperature of 30.00° C., [(4)]For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in US 2011/0015346 A1.

CDR Method

The weight percentage of the materials eluting in the elution temperature range between T1(° C.) and T2(° C.) is defined as the integral of the IR-4 chromatogram (baseline subtracted measurement channel) in the elution temperature ranging from T1 to T2 divided by the total integral from 25.5 to 118.0° C., as shown in Equation 1 through Equation 5, where T is the elution temperature (from the calibration discussed above). The Comonomer Distribution Ratio (CDR) is calculated as shown in Equation 6.

$$\text{Materials eluting from } T1 \text{ to } T2, \% = 100 \times \frac{\int_{T1}^{T2} IRdT}{\int_{25.5}^{118.0} IRdT} \quad \text{Equation 1}$$

$$\text{Materials eluting below } 45.0 \ C., \% = 100 \times \frac{\int_{25.5}^{45.0} IRdT}{\int_{25.5}^{118.0} IRdT} \quad \text{Equation 2}$$

$$\text{Materials eluting between 45.0 and 65.0 } C., \quad \text{Equation 3}$$
$$\% = 100 \times \frac{\int_{45.0}^{65.0} IRdT}{\int_{25.5}^{118.0} IRdT}$$

$$\text{Materials eluting between 65.0 and 80.0 } C., \quad \text{Equation 4}$$
$$\% = 100 \times \frac{\int_{65.0}^{80.0} IRdT}{\int_{25.5}^{118.0} IRdT}$$

$$\text{Materials eluting above 97.0 } C., \% = 100 \times \frac{\int_{97.0}^{118.0} IRdT}{\int_{25.5}^{118.0} IRdT} \quad \text{Equation 5}$$

$$\text{Comonomer Distribution Ratio } (CDR) = \quad \text{Equation 6}$$
$$\log((\text{Equation 2})(\text{Equation 3})(\text{Equation 4})) * (\text{Equation 5})$$

A linear baseline is calculated by selecting two data points: one before the polymer elutes, usually at temperature of 26° C., and another one after the polymer elutes, usually at 118° C. For each data point, the detector signal is subtracted from the baseline before integration.

Mw Ratio

The polymer molecular weight can be determined directly from light scattering (LS) and the concentration detector according to the Rayleigh-Gans-Debys approximation (A. M. Striegel and W. W. Yau, Modern Size-Exclusion Liquid Chromatography, $2^{nd}$ Edition, Page 242 and Page 263, 2009) by assuming a form factor of 1 and all the virial coefficients equal to zero. Baselines are subtracted from the LS (90 degree) and IR-4 (measurement channel) chromatograms. For the whole resin, the integration window is set to include all of the chromatograms in the elution temperature (temperature calibration is specified above) range from 25.5 to 118.0° C. The Molecular Weight Ratio (Mw Ratio) includes the following steps:

(1) Measuring the interdetector offset. The offset is defined as the geometric volume offset between LS with respect to the IR-4 detector. It is calculated as the difference in elution volume (mL) of the polymer peak between the IR-4 and LS chromatograms. It is converted to the temperature offset by using the elution thermal rate and elution flow rate. A high density polyethylene (with no comonomer, $I_2$ of 1.0, polydispersity or molecular weight distribution $M_w/M_n$ approximately 2.6 by conventional gel permeation chromatography) is used. The same experimental conditions as the CEF method above are used except for the following parameters: crystallization at 10° C./min from 140° C. to 137° C., thermal equilibrium at 137° C. for 1 minute as the Soluble Fraction Elution Time, and elution at 1° C./min from 137° C. to 142° C. The flow rate during crystallization is 0.10 ml/min. The flow rate during elution is 0.80 ml/min. The sample concentration is 1.0 mg/ml.

(2) Each data point in the LS chromatogram is shifted to correct for the interdetector offset before integration.

(3) The baseline subtracted LS and IR-4 chromatograms are integrated in the elution temperature range of 25.5 to 118.0° C. and for the elution temperature range of 97.0 to 118.0° C.

(4) The Molecular weight Ratio (Mw Ratio) is calculated according to Equation 7

$$Mw \text{ Ratio} = \frac{\int_{97.0}^{118.0} LSdT}{\int_{25.5}^{118.0} LSdT} \quad \text{Equation 7}$$

The white noise level of the LS detector (90 degree) is calculated from the LS chromatogram prior to the polymer eluting. The LS chromatogram is first corrected for the baseline correction to obtain the baseline subtracted signal. The white noise of the LS is calculated as the standard deviation of the baseline subtracted LS signal by using at least 100 data points prior to the polymer eluting. Typical white noise for LS is 0.20 to 0.35 mV while the whole polymer has a baseline subtracted peak height typically around 170 mV for the high density polyethylene with no comonomer, $I_2$ of 1.0, polydispersity $M_w/M_n$ approximately 2.6 used in the interdetector offset measurements. Care should be maintained to provide a signal to noise ratio (the peak height of the whole polymer to the white noise) of at least 450 for the high density polyethylene.

Melting point is determined using a differential scanning calorimeter (DSC). Samples of polymer were pressed into a thin film at a temperature of 350° F. (pressed for 10 seconds and 1,500 psi). About 5 to 8 mg of sample was weighed out and placed in a DSC pan. A lid was crimped on the pan to ensure a closed atmosphere. The sample pan was placed in the DSC (TA Instruments DSC Q1000) cell and then heated at a high rate of about 100° C./min to a temperature at least 30° C. above the polymer melt temperature, or 180° C. The sample was kept at this temperature for about 5 minutes. Then the sample was cooled at a rate of 10° C./min to a least 50° C. below the crystallization temperature, or −40° C., and kept isothermally at that temperature for 5 minutes. The sample was then heated at a rate of 10° C./min until melting was complete. The cooling and second heating curves were recorded. The cooling curve was analyzed by setting baseline endpoints from the beginning of crystallization to −20° C. The heat curve was analyzed by setting baseline endpoints from −20° C. to the end of melt. The values determined are peak melting temperature ($T_m$), peak crystallization temperature ($T_c$), heat of fusion ($H_f$) (in J/g), and the calculated % crystallinity for polyethylene samples using the Equation 8:

% Crystallinity=(($H_f$)/(292 J/g))×100      Equation 8

The heat of fusion ($H_f$) and the peak melting temperature are reported from the second heat curve. The peak crystallization temperature was determined from the cooling curve. Baseline calibration of the TA Instruments DSC Q1000 was performed by using the calibration wizard in the software. First, a baseline was obtained by heating the cell from −80° C. to 280° C. without any sample in the aluminum DSC pan. After that, sapphire standards were used according to the instructions in the wizard. Then about 1-2 mg of a fresh indium sample were analyzed by heating the sample to 180° C., cooling the sample to 120° C. at a cooling rate of 10° C./min followed by keeping the sample isothermally at 120° C. for 1 minute, followed by heating the sample from 120° C. to 180° C. at a heating rate of 10° C./min. The heat of fusion and the onset of melting of the indium sample were determined and checked to be within 0.5° C. from 156.6° C. for the onset of melting and within 0.5 J/g from 28.71 J/g for the heat of fusion. Then deionized water was analyzed by cooling a small drop of fresh sample in the DSC pan from 25° C. to −30° C. at a cooling rate of 10° C./min. The sample was kept isothermally at −30° C. for 2 minutes and heated to 30° C. at a heating rate of 10° C./min. The onset of melting was determined and checked to be within 0.5° C. from 0° C.

A blend of two resins was used in some cases for CEF and DSC testing. This blend was made on a Haake Rheomix with a 50 g bowl by adding 50 grams total of the components in the desired weight percent ratio. The three temperature zone settings of the Haake were at 175° C. The sample was mixed at 50 RPM (revolutions per minute) for a total of 10 minutes in which 5 minutes was used to reach the peak torque and 5 minutes were used for mixing of the sample.

One aspect of the present invention is a process for forming a biaxially oriented film comprising the steps of: a) selecting a polyolefin resin wherein said polyolefin resin comprises a linear low density polyethylene resin characterized by having from 9 to 35 weight percent of the total weight of the linear low density polyethylene resin eluting from a CEF at a temperature greater than 97.0° C.; and further characterized by having a CDR of from 33 to 80 and a Mw Ratio of from 0.15 to 0.45; b) forming a film from the polyolefin resin selected in step (a); and c) orienting the film formed in step (b), preferably in a range of from 3 to 5 times in the machine direction and from 4 to 7 times in the cross direction, wherein said film is characterized by having: a) an ultimate elongation at least 1.5 times greater in the MD as compared to the CD, b) a 2% secant modulus which is a least 1.25 times greater in the CD as compared to the MD, and c) free residual shrinkage of less than 10% in the MD and less than 10% in the CD when exposed to a temperature of 90° C. for 10 minutes, more preferably less than 5% in both the MD and the CD. It is preferred that the film has a free residual shrinkage of less than 5% in the MD and less than 5% in the CD when exposed to a temperature of 70° C. for 10 minutes.

The polyolefin resin used in the present invention comprises a linear low density polyethylene (LLDPE) resin. LLDPE's include Ziegler Natta catalyzed linear low density polyethylene, single site catalyzed (including metallocene) linear low density polyethylene (m-LLDPE), and medium density polyethylene (MDPE) so long as the MDPE has a density no greater than 0.940 g/cm³; as well as combinations of two or more of the foregoing. These polyethylene resins are generally known in the art. The LLDPE resins best suited for use in the present application can be characterized by the following three parameters.

The first parameter for the LLDPE for use in the present invention is having from 9 to 35 weight percent of the total weight of the linear low density polyethylene resin eluting from a CEF at a temperature greater than 97° C. Preferably no more than 25% elutes at a temperature greater than 97° C.

The second parameter for the LLDPE for use in the present invention is having a CDR of from 33 to 80.

The third parameter for the LLDPE for use in the present invention is having a Mw Ratio of from 0.15 to 0.45. Preferably the Mw Ratio is not more than 0.35.

The LLDPE preferably has a highest melting point greater than or equal to 120° C.

The LLDPE preferably has a melt index (190° C., 2.16 kg) in the range of from 1 to 30 g/10 minutes, preferably from 2 to 15 g/10 minutes.

The LLDPE preferably has a density in the range of from 0.90 to 0.94 g/cm³, preferably from 0.91 to 0.935 g/cm³.

Preferably, the polyethylene resin used in the present invention is a single resin although blends of the above material with other resins, including other polyethylene resins as well as higher alpha olefin (that is olefins derived from monomers having more than 2 carbons) polyolefin resins and copolymers may be used. In a preferred embodiment the film will comprise only polyethylene resins, but polypropylene can also be blended or co-extruded in the film structure. In some embodiments the polyolefin resin preferably comprises less than 1% by weight polypropylene.

The polyolefin resin used in the present invention may contain one or more additives as is generally known in the art. Such additives include antioxidants, such as IRGANOX 1010 and IRGAFOS 168 (Ciba Specialty Chemicals; Glattbrugg, Switzerland), ultraviolet light absorbers, antistatic agents, pigments, dyes, nucleating agents, fillers, slip agents, fire retardants, plasticizers, processing aids, lubricants, stabilizers, smoke inhibitors, viscosity control agents, surface modification agents, and anti-blocking agents. The polyolefin resin composition may advantageously, for example, comprise less than 10 percent by the combined weight of one or more additives, based on the weight of the polyolefin polymer.

The second step in the process of the first embodiment of the present invention is to form a film web from the polyolefin resin selected in the first step. Films may be made according to any method known in the art. Cast films are common processes used in the art.

Once the film web is formed, it is subjected to a tenter frame process in which the film is preferably oriented in the machine direction (MD) first, followed by orientation in the cross direction (CD). The orientation ratio is in a range of from 3 to 5 times in the machine direction and from 3 to 7 times in the cross direction. Orientation can be provided by the tenter frame process.

Another aspect of the present invention is a biaxially oriented film comprising a polyolefin resin wherein said polyolefin resin comprises a linear low density polyethylene resin characterized by having from 9 to 35 weight percent of the total weight of the linear low density polyethylene resin eluting from a CEF at a temperature greater than 97.0° C.; and further characterized by having a CDR of from 33 to 80 and a Mw Ratio of from 0.15 to 0.45 wherein said film is characterized by free residual shrinkage of less than 10% in the MD and less than 10% in the CD when exposed to a temperature of 90° C. for 10 minutes, more preferably less than or equal to 5% in both the MD and the CD. The films produced by the inventive method can be further characterized by having elongation at least 1.5 times (more preferably at least 1.75 or even 2 times) greater in the MD as compared to the CD. Further the films can be characterized by having a 2% secant modulus which is a least 1.25 times greater in the CD as compared to the MD, more preferably at least 1.5 or even 1.75 times greater.

In another aspect, the invented film can be surface treated to a surface tension more than 38 dyne/cm, such as by corona treatment or flame treatment as is generally known in the art. Surface treatment is helpful to enable the downstream printing and lamination process.

The films of the present invention can be mono layer films or multilayer films wherein the overall film structure meets the limitations of the claims. For multi-layer films, it is preferred that the film comprises one or more core layers and two skin layers, wherein at least one core layer has a higher density than at least one of the skin layers.

In another aspect, the invented film can be laminated with other substrates to form a laminated structure. Suitable substrates include but are not limited to, biaxially oriented polypropylene film, oriented PET, film, oriented Polyamide film, blown and cast PE film, aluminum foil and paper.

EXPERIMENTAL

In order to demonstrate the effectiveness of the present invention a series of oriented films are made. The films use the following resins in Table 1. CEF results are summarized in Table 2 and DSC results are summarized in Table 3. For the DSC results, results are shown for all melting points ($T_{m1}$-$T_{m3}$) and all crystallization points ($T_{c1}$-$T_{c3}$). For both the CEF and DSC data are shown for a blend that is in the core layer of film Example 2 shown in Table 4 (25% A/75% B) and the total percentage of resins used in film Example 2 of Table 4 (53% A/47% B).

TABLE 1

Resins used in oriented films.

| Resin # | Melt Index ($I_2$) | Density (g/cm³) | Comonomer | Resin type |
|---|---|---|---|---|
| A | 2.3 | 0.917 | Octene | Solution Ziegler-Natta LLDPE |
| B | 2.5 | 0.935 | Octene | Solution Ziegler-Natta LLDPE |
| C | 2.0 | 0.918 | Butene | Gas phase Ziegler-Natta LLDPE |
| D | 3.5 | 0.918 | Hexene | Gas phase metallocene LLDPE |
| E | 3.5 | 0.915 | Octene | Solution phase dual reactor using both constrained geometry catalyst and Ziegler Natta catalyst |

TABLE 2

CEF results.

| Resin# | Materials eluting below 45.0 C. % | Materials eluting between 45.0 to 65.0 C. % | Materials eluting between 65.0 to 80.0 C. % | Materials eluting above 97.0 C. % | Comonomer Distribution Ratio (CDR) | Mw Ratio |
|---|---|---|---|---|---|---|
| A | 9.43 | 14.12 | 27.10 | 11.63 | 41.37 | 0.20 |
| 25% A + 75% B | 3.45 | 4.73 | 12.78 | 32.58 | 75.56 | 0.39 |
| 53% A + 47% B | 5.59 | 8.03 | 17.97 | 24.74 | 71.91 | 0.32 |
| C | 9.91 | 12.82 | 25.50 | 8.73 | 30.65 | <0.10 |
| D | 1.23 | 5.14 | 37.27 | 0.25 | 0.59 | <0.10 |
| E | 4.75 | 11.77 | 53.73 | 5.45 | 18.95 | <0.10 |

TABLE 3

DSC results.

| Resin # | $T_{m1}$ (° C.) | $T_{m2}$ (° C.) | $T_{m3}$ (° C.) | Heat of Fusion (J/g) | % Cryst. | $T_{c1}$ (° C.) | $T_{c2}$ (° C.) | $T_{c3}$ (° C.) |
|---|---|---|---|---|---|---|---|---|
| A | 122.7 | 117.9 | 109.4 | 138.6 | 47.5 | 103.7 | 60.8 | |
| B | 124.4 | | | 174.4 | 59.7 | 111.3 | 74.6 | |
| 25% A + 75% B | 124.1 | | | 172.3 | 59.0 | 113.4 | | |

TABLE 3-continued

DSC results.

| Resin # | $T_{m1}$ (° C.) | $T_{m2}$ (° C.) | $T_{m3}$ (° C.) | Heat of Fusion (J/g) | % Cryst. | $T_{c1}$ (° C.) | $T_{c2}$ (° C.) | $T_{c3}$ (° C.) |
|---|---|---|---|---|---|---|---|---|
| 53% A + 47% B | 122.9 | | | 157.1 | 53.8 | 110.1 | 66.98 | |
| C | 119.5 | | | 132.9 | 45.5 | 105.9 | 62.0 | |
| D | 113.7 | | | 139.5 | 47.8 | 101.0 | 64.2 | |
| E | 122.5 | 117.3 | 104.5 | 135.2 | 46.3 | 104.5 | 95.2 | 60.1 |

Three layer films are fabricated on a tailor-made tenter frame bi-orientation line according to the Table 4.

TABLE 4

Three layer films fabricated on tenter frame bi-orientation line.

| Example # | Layer A | Layer B | Layer C |
|---|---|---|---|
| 1 | A | A | A |
| 2 | A | 25% A/75% B | A |
| 3 (comp) | C | C | C |
| 4 (comp) | E | E | E |
| 5 (comp) | D | D | D |

The tenter-frame line has a 3-layer co-extrusion line. The output ratio of the three extruders is 1:5:2. After extruding from a flat die, the film is cooled down on a chill roll, and is immersed into a water bath filled with room temperature water. This cast film is then passed onto a series of rollers with different revolving speeds to achieve MD stretching. There are 3 pairs of rollers in the MD stretching segment of the fabrication line, which are all oil heated. The first pair of rollers is pre-heated. The second pair is stretching rollers. The last pair of rollers is for relaxing and annealing. The temperature of each pair of rollers is controlled separately.

After MD stretching, the film web is passed into a tenter-frame hot air oven containing 7 heating zones to carry out the CD stretching. The first 3 zones are for pre-heating and the following 2 zones are for stretching. The last 2 zones are for annealing. The temperature of each zone is controlled separately. All temperatures of each roller for MD stretching and each heating zone for CD stretching are listed in the columns "MD Stretch Temp." and "CD Stretch Temp." of Table 5. The CD orientation ratio of this tailor made tenter frame line is fixed at 5.5 times. The MD stretch ratio is maintained at 4 times. Detailed processing information is listed in Table 5.

TABLE 5

Detailed process information for films made on tenter frame line.

| Example # | Layer Ratio | Stretch Ratio (MD/CD) | MD Stretch Temp. (° C.) | | | CD Stretch Temp. (° C.) | | |
|---|---|---|---|---|---|---|---|---|
| | | | Preheat | Stretch | Anneal | Preheat | Stretch | Anneal |
| 1 | 1:5:2 | 4/5.5 | 110 | 97 | 100 | 123-120-120 | 105-105 | 160-109 |
| 2 | 1:5:2 | 4/5.5 | 115 | 112 | 100 | 134-131-130 | 114-114 | 116-112 |
| 3 (comp) | 1:5:2 | 4/5.5 | 108 | 110 | 103 | 124-125-125 | 111-111 | 113-112 |
| 4 (comp) | 1:5:2 | 4/5.5 | 112 | 98 | 100 | 123-121-122 | 105-105 | 107-109 |
| 5 (comp) | 1:5:2 | 4/5.5 | 114 | 99 | 101 | 122-122-122 | 106-106 | 110-109 |

The results of the processing for such films are as follows: For Example 1, Film fabrication went smoothly for over 1 hour with no film breaks during fabrication. For Example 2, film fabrication went smoothly for 40 minutes with no film breaks during fabrication. For Example 3 (comparative), the film web broke every 1~2 minutes, during CD stretching. For Example 4 (comparative), the film web broke every 2~3 minutes, during CD stretching. For Example 5 (comparative), the film web always broke during CD stretching and no continuous film was collected. Table 6 shows the average thickness of the films collected and the standard deviation of the thickness.

TABLE 6

Average thickness of films collected and their standard deviation.

| | Example 1 | Example 2 | Example 3 (comp) | Example 4 (comp) |
|---|---|---|---|---|
| Average Thickness (μm) | 29.6 | 24.2 | 23.5 | 28.8 |
| Std. Dev. of Thickness (μm) | 1.93 | 1.35 | 3.06 | 3.46 |

From observations of the film processing and the film thickness variation, one can conclude that inventive film Example 1 and Example 2 could be commercially run but films of Comparative Examples 3-5 could not be commercially produced due to frequent film breakage and large film thickness variation. It is a goal of the present invention to be able to produce films having acceptable physical properties (for example, residual shrink, seal strength, and heat seal initiation temperature) while at the same time acceptable processability characteristics such that the films can be commercially produced.

For most flexible packaging applications, residual shrinkage is not a desired property. This is because high residual shrinkage will lead to sealing winkles or dimensional instability in the downstream lamination or printing process. Although residual shrinkage could be further reduced by fine tuning the annealing conditions in commercial production, the film of Example 2 showed the least residual shrinkage, and Example 1 demonstrated commercially acceptable residual shrinkage of less than 10%. It should be noted that while comparative Examples 3 and 4 have lower residual shrinkage than the inventive Example 1, these films would not be commercially acceptable due to the frequent film breakage in the orientation process as mentioned above. The residual shrinkage results are shown in Table 7.

TABLE 7

Residual % shrinkage at 70° C. and 90° C. of films collected.

| Residual % | Oven Temperature (° C.) | | | |
|---|---|---|---|---|
| | 70 | | 90 | |
| Shrinkage | MD | CD | MD | CD |
| Example 1 | 4.50 | 0.60 | 6.53 | 9.50 |
| Example 2 | 0.61 | 0.70 | 3.02 | 4.02 |
| Example 3 (comp) | 2.00 | 1.20 | 4.00 | 5.09 |
| Example 4 (comp) | 3.02 | 0.90 | 6.28 | 8.63 |

Figure 2:
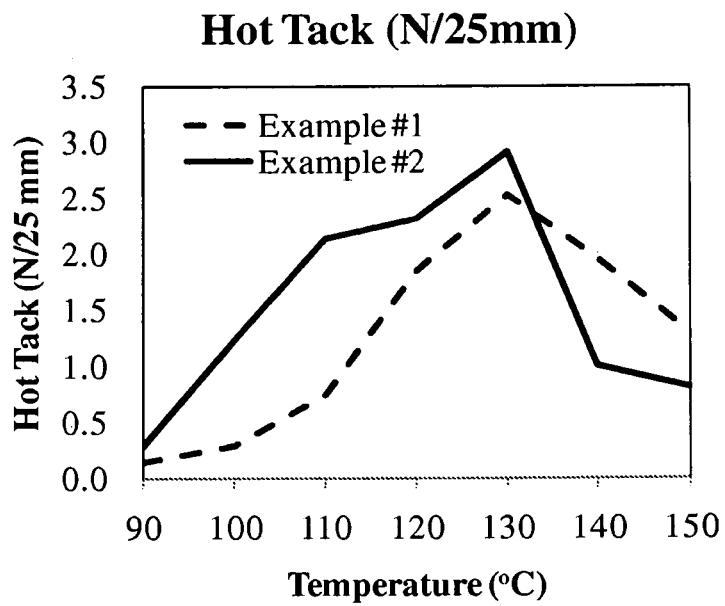
FIG. 2 is a graph showing hot tack as a function of sealing temperature for Examples 1-2.

The inventive films were then evaluated to determine ultimate heat seal strength and hot tack strength at various sealing temperatures as shown in FIGS. 1 and 2 and Tables 8 and 9. The data for the comparative films is not presented as they could not be run under commercial conditions.

TABLE 8

Seal strength data of films collected.

| Seal Strength | Seal Temperature (° C.) | | | | | | |
|---|---|---|---|---|---|---|---|
| (N/25 mm) | 90 | 100 | 110 | 120 | 130 | 140 | 150 |
| Example 1 | 0.72 | 0.85 | 1.11 | 2.63 | 17.73 | 14.41 | 22.34 |
| Example 2 | 0.76 | 1.08 | 5.83 | 8.78 | 11.67 | 15.94 | 15.72 |

TABLE 9

Seal strength data of films collected.

| Hot Tack | Seal Temperature (° C.) | | | | | | |
|---|---|---|---|---|---|---|---|
| (N/25 mm) | 90 | 100 | 110 | 120 | 130 | 140 | 150 |
| Example 1 | 0.14 | 0.28 | 0.74 | 1.84 | 2.52 | 1.96 | 1.29 |
| Example 2 | 0.29 | 1.23 | 2.13 | 2.31 | 2.91 | 1.00 | 0.81 |

The tensile properties and dart drop impact resistance data of Example 1 and Example 2 are listed in Table 10. Typical properties of 20 and 25 micron cast film made of 100% Resin A and 100% Resin B are also included, to compare the improvement of tensile strength, modulus and impact resistance after orientation. Both monolayer casting films of Resin A and Resin B were fabricated on a 5-layer cast line, with the same melt temperature (273~274° C.) and chill roll temperature (21° C.), but different line speeds (122 m/min for film of Resin A; 183 m/min for film of Resin B). The inventive film physical properties are significantly improved by orientation.

TABLE 10

Tensile properties and dart impact data of Example 1 and Example 2 and 100% Resin A and 100% Resin A made by a cast film process.

| TEST name TENSILE | UNIT | Example 1 | Example 2 | 100% A (20 microns) | 100% B (25 microns) |
|---|---|---|---|---|---|
| Ultimate Tensile Strength - MD | MPa | 85.1 | 54.6 | 50 | 59 |
| Ultimate Elongation - MD | % | 255 | 245 | 460 | 620 |
| Ultimate Tensile Strength - CD | MPa | 94.4 | 78.4 | 28 | 39 |
| Ultimate Elongation - CD | % | 134 | 92 | 650 | 750 |
| 2% Secant Modulus - MD | MPa | 199.6 | 329.1 | ~160* | ~350* |
| 2% Secant Modulus - CD | MPa | 263 | 503.8 | ~160* | ~350* |
| DART DROP IMPACT (Type A) | g | 610.5 | 357.0 | 210 | 57 |

*estimated value

The films of Table 10 were made on a pilot production line, which has no surface treatment device attached. But surface treatment, such as corona treatment, is preferred for commercial production for downstream printing or lamination. The inventive film can be laminated to a substrate, such as PET, bi-oriented polyamide (BOPA), and/or bi-oriented polypropylene (BOPP) films to form a laminated structure for flexible packaging.

The following embodiments are considered within the scope of the invention, and applicants reserve the right to amend the claims or to file one or more additional applications to specifically claim any of these embodiments which are not already expressly recited in the current listing of the claims. Moreover, it is expressly contemplated that the limitations set forth in the below recitations may be combined in any order which is not logically inconsistent.

1. A process for forming a biaxially oriented film comprising the steps of:
   a. selecting a polyolefin resin wherein said polyolefin resin comprises a linear low density polyethylene resin characterized by having from 9 to 35 weight percent of the total weight of linear low density polyethylene resin eluting from a CEF at a temperature greater than 97.0° C.; and further characterized by having a CDR of from 33 to 80 and a Mw Ratio of from 0.15 to 0.45;
   b. forming a film from the polyolefin resin selected in step (a),
   c. orienting the film formed in step (b);
   wherein the film is characterized by having elongation at least 1.5 times greater in the MD as compared to the CD and the modulus is a least 1.25 times greater in the CD as compared to the MD;
   and wherein the film is characterized by having free residual shrinkage of less than 10% in the MD and less than 10% in the CD when exposed to a temperature of 90° C. for 10 minutes.

2. The process of embodiment 1 wherein the film formed in step (b) is oriented in a range of from 3 to 5 times in the machine direction and from 3 to 7 times in the cross direction.

3. The process of embodiment 1 wherein the film is characterized by having elongation at least 1.75 times greater in the MD as compared to the CD.

4. The process of embodiment 1 wherein the film is characterized by having elongation at least 2 times greater in the MD as compared to the CD.

5. The process of embodiment 1 wherein the film is characterized by having a 2% secant modulus at least 1.5 times greater in the MD as compared to the CD.

6. The process of embodiment 1 wherein the film is characterized by having 2% secant modulus at least 1.75 times greater in the MD as compared to the CD.

7. The process of embodiment 1 wherein the free residual shrinkage at 90° C. is less than 5% in at least one of the MD or CD.

8. The process of Embodiment 1 wherein the polyolefin resin has a highest melting point greater than or equal to 120° C.

9. The process of embodiment 1 wherein the polyolefin resin has a melt index (190° C., 2.16 kg) in the range of from 1 to 30 g/10 minutes.

10. The process of embodiment 1 wherein the polyolefin resin has a melt index (190° C., 2.16 kg) in the range of from 2 to 15 g/10 minutes.

11. The process of embodiment 1 wherein the polyolefin resin has a density in the range of from 0.90 to 0.94 g/cm$^3$.

12. The process of embodiment 1 wherein the polyolefin resin has a density in the range of from 0.91 to 0.935 g/cm$^3$.

13. The process of embodiment 1 wherein the polyolefin resin comprises less than 1% by weight polypropylene.

14. The process of embodiment 1 wherein the polyolefin resin consists essentially of the linear low density polyethylene and one or more additives selected from the group consisting of slip, antiblock, polymer processing aid or color pigment.

15. The process of embodiment 1 wherein the film is oriented using a tenter frame.

16. The process of embodiment 1 wherein the polyolefin resin has not been crosslinked.

17. The process of embodiment 1 wherein the film is oriented in the MD prior to orientation in the cross direction.

18. A biaxially oriented film comprising:
a polyolefin resin wherein said polyolefin resin comprises a linear low density polyethylene resin characterized by having from 9 to 35 weight percent of the total weight of linear low density polyethylene resin eluting from a CEF at a temperature greater than 97.0° C.; and further characterized by having a CDR of from 33 to 80 and a Mw Ratio of from 0.15 to 0.45;
wherein said film is surface treated to exhibit a surface tension of greater than or equal to 38 dyne/cm surface tension; wherein the film is characterized by having an ultimate elongation at least 1.5 times greater in the MD as compared to the CD and the 2% secant modulus is a least 1.25 times greater in the CD as compared to the MD;
and wherein the film is characterized by having free residual shrinkage of less than 10% in the MD and less than 10% in the CD when exposed to a temperature of 90° C. for 10 minutes.

19. The film produced by embodiment 18 wherein the film has a thickness of from 10-100 microns.

20. The film of embodiment 19 wherein the film has a thickness of from 20 to 50 microns.

21. The film of embodiment 18 in which the film is a mono layer film.

22. The film of embodiment 18 in which the film is a multilayer film.

23. The film of embodiment 22 wherein the film comprises one or more core layers and two skin layers and wherein at least one core layer has a higher density than at least one of the skin layers.

24 A laminated film structure comprising a substrate with the film of embodiment 18 laminated thereto.

25. The laminated film structure of embodiment 24 wherein the substrate is selected from the group consisting of one or more of the following: bi-oriented polypropylene film, oriented polyethylene terephthalate film, oriented polyamide film, blown or cast PE film, aluminum foil and paper.

26. The process of embodiment 1 wherein the polyolefin resin has a heat of fusion greater than 137 J/g.

Although the invention has been described in considerable detail through the preceding description and examples, this detail is for the purpose of illustration and is not to be construed as a limitation on the scope of the invention as it is described in the appended claims. To the extent permitted by law or regulations, all United States patents, published patent applications and allowed patent applications identified above are incorporated herein by reference.

The invention claimed is:

1. A process for forming a biaxially oriented film comprising the steps of:
    a. selecting a polyolefin resin, wherein said polyolefin resin comprises a linear low density polyethylene resin characterized by having from 9 to 35 weight percent of the total weight of the linear low density polyethylene resin eluting from a crystallization elution fractionation (CEF) at a temperature greater than 97.0° C., a comonomer distribution ratio (CDR) of from 33 to 80, and a molecular weight ratio (Mw Ratio) of from 0.15 to 0.45;
    b. forming a film from the polyolefin resin selected in step (a); and
    c. biaxially orienting the film formed in step (b),
    wherein the resulting film after said orienting in step (c) is characterized by having an ultimate elongation which is at least 1.5 times greater in the machine direction (MD) of the film as compared to the cross direction (CD) of the film and a 2% secant modulus of at least 1.25 times greater in the CD as compared to the MD,
    wherein the resulting film after said orienting in step (c) is further characterized by having free residual shrinkage of less than 10% in the MD and less than 10% in the CD when exposed to a temperature of 90° C. for 10 minutes,
    and wherein the polyolefin resin selected in step (a) permits use of applied temperature and stretching ratio conditions for said orientation step (c) to be chosen within a relatively broad range during the orienting process without a substantial loss in quality of the bioriented film, as compared to a film formed with a polyethylene resin which does not have the CEF, CDR, and Mw Ratio parameters of the polyolefin resin selected in step (a).

2. The process of claim 1 wherein the film formed in step (b) is oriented in step (c) in a range of from 3 to 5 times in the machine direction and from 3 to 7 times in the cross direction.

3. The process of claim 1 wherein the oriented film is characterized by having an elongation of at least 2 times greater in the MD as compared to the CD.

4. The process of claim 1 wherein the film is characterized by having a 2% secant modulus at least 1.75 times greater in the CD as compared to the MD.

5. The process of claim 1 wherein the free residual shrinkage is less than 5% in at least one of the MD or CD.

6. The process of claim 1 wherein the polyolefin resin has a highest melting point greater than or equal to 120° C. and a heat of fusion greater than 137 J/g.

7. The process of claim 1 wherein the polyolefin resin has a melt index (190° C., 2.16 kg) in the range of from 2 to 15 g/10 minutes.

8. The process of claim 1 wherein the polyolefin resin has a density in the range of from 0.91 to 0.935 g/cm$^3$.

9. The process of claim 1 wherein the polyolefin resin comprises less than 1% by weight polypropylene.

10. The process of claim 1 wherein the polyolefin resin consists essentially of the linear low density polyethylene and one or more additives selected from the group consisting of a slip additive, an antiblock additive, a polymer processing aid or a color pigment.

11. The process of claim 1 wherein the film is oriented in step (c) using a tenter frame.

12. The process of claim 1 wherein the polyolefin resin of step (a) has not been crosslinked.

13. The process of claim 1 wherein the orienting step (c) is carried out by orienting the film in the MD prior to orienting in the cross direction.

* * * * *